(12) United States Patent
Gray-Donald et al.

(10) Patent No.: US 7,992,136 B2
(45) Date of Patent: Aug. 2, 2011

(54) METHOD AND APPARATUS FOR AUTOMATIC APPLICATION PROFILING

(75) Inventors: Trent A. Gray-Donald, Ottawa (CA); Frank E. Levine, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 1232 days.

(21) Appl. No.: 11/550,603

(22) Filed: Oct. 18, 2006

(65) Prior Publication Data

US 2008/0098364 A1  Apr. 24, 2008

(51) Int. Cl.
*G06F 9/44* (2006.01)
(52) U.S. Cl. ............ 717/130; 717/131; 717/124
(58) Field of Classification Search ......... 717/130, 717/131, 124
See application file for complete search history.

(56) References Cited

U.S. PATENT DOCUMENTS

| | | | |
|---|---|---|---|
| 5,890,014 A * | 3/1999 | Long | 710/8 |
| 2004/0010785 A1* | 1/2004 | Chauvel et al. | 717/158 |
| 2004/0128446 A1* | 7/2004 | Dulong | 717/130 |
| 2004/0153847 A1 | 8/2004 | Apte et al. | |
| 2004/0163077 A1 | 8/2004 | Dimpsey et al. | |
| 2005/0155026 A1 | 7/2005 | DeWitt, Jr. et al. | |
| 2006/0136877 A1 | 6/2006 | Gdaniec et al. | |

OTHER PUBLICATIONS

Liang et al., "Comprehensive Profiling Support in the Java Virtual Machine", 1999, 5th USENIX Conference on Object-Oriented Technologies and Systems, San Diego, California, USA, pp. 1-13.

* cited by examiner

*Primary Examiner* — Wei Zhen
*Assistant Examiner* — Qamrun Nahar
(74) *Attorney, Agent, or Firm* — Yee & Associates, P.C.; David A. Mims, Jr.

(57) ABSTRACT

A computer implemented method, apparatus, and computer usable program code for profiling an application. Data is collected for analyzing performance of the application using a device driver for a profiler in an operating system kernel in response to the application executing in a virtual machine. Data is stored in a buffer. A report is generated containing the data from the buffer in response to an event in the virtual machine, wherein the application is profiled using the report. Collection of the data is halted in response to the application terminating execution in the virtual machine.

14 Claims, 3 Drawing Sheets

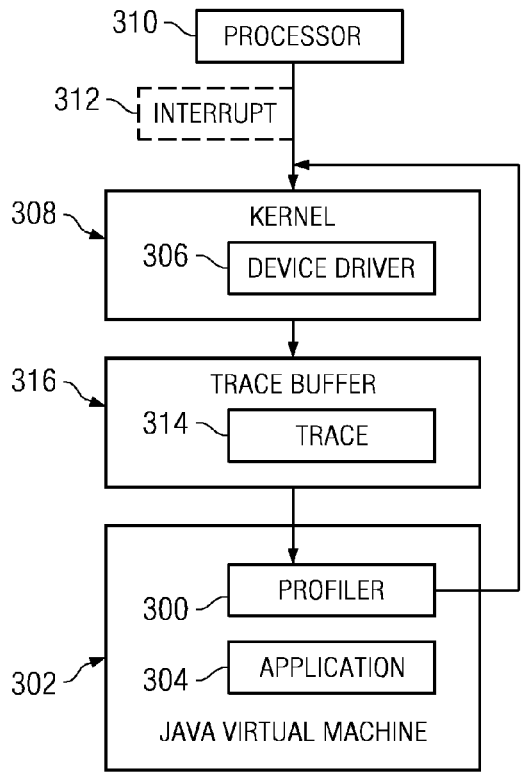
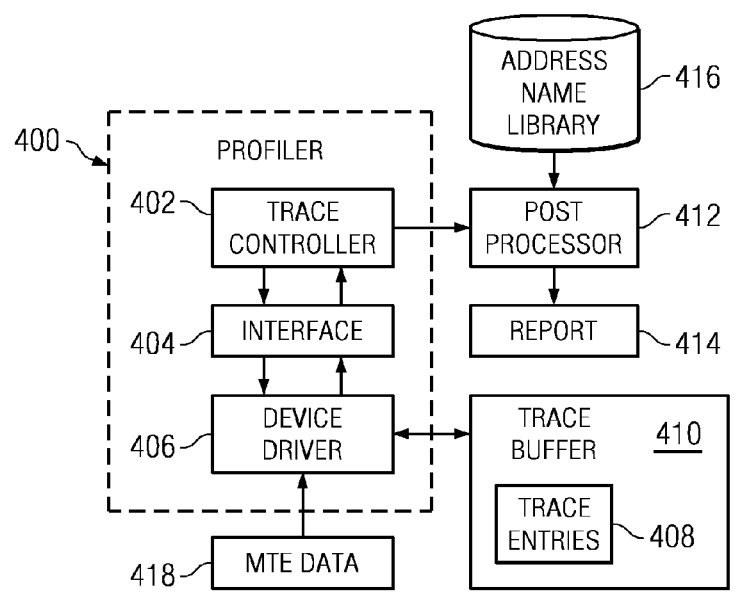

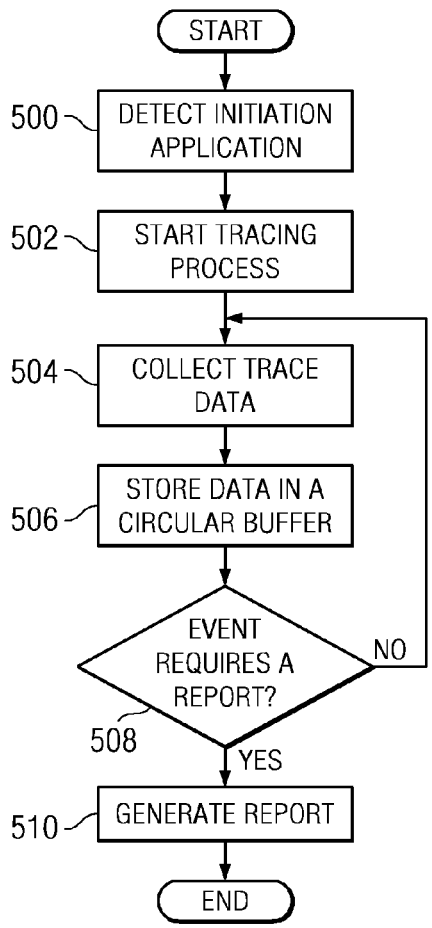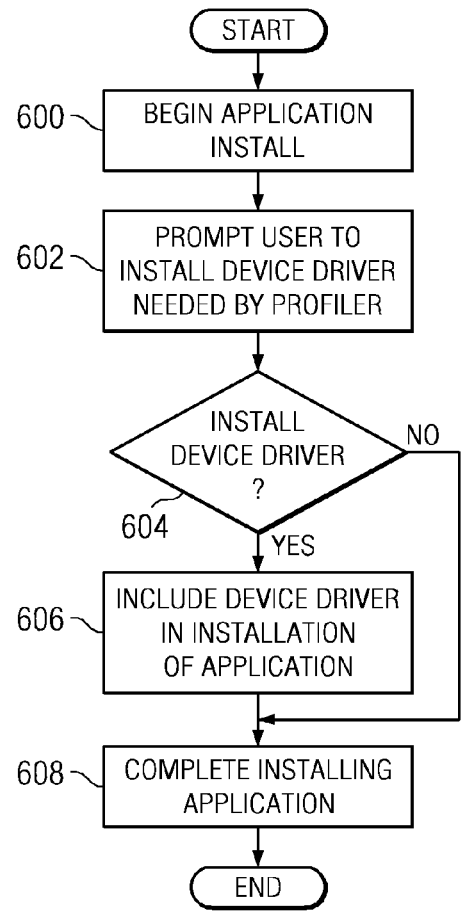

METHOD AND APPARATUS FOR AUTOMATIC APPLICATION PROFILING

BACKGROUND OF THE INVENTION

1. Field of the Invention

The present invention relates generally to an improved data processing system and in particular to a method and apparatus for processing data. Still more particularly, the present invention relates to a computer implemented method, apparatus, and computer usable program code for identifying performance problems in an application.

2. Description of the Related Art

Performance analysis tools are employed to work with large volumes of highly complex data of varying types and varying levels of granularity. In analyzing the performance of an application, the performance is measured, constraints to the level of performance achieved are found, and those effects are eliminated and reduced. Thereafter, the performance may then be measured again with the changes to the application. Many tools have been developed to assist in dealing with the challenges in analyzing the performance of applications. These tools include system and application profilers, such as tprof, which is a profiling application available from International Business Machines Corporation. Tprof is a time-based profiling technique in which a separate hardware time-based interrupt is used to gather data. This time-based interrupt is used for each processor in a system. The use of this type of performance tool as well as other performance tools are employed when developing programs. These tools also may be used to diagnose problems in the field after an application has been released for use. This type of diagnosis may be expensive because of the time needed by a performance analyst to visit a site and gather data for analysis. Further, this type of process may be difficult to implement if a user or customer is required to follow special procedures to gather data for the analyst. Further, identifying the cause of a performance problem may be difficult for an application in actual use because difficulties may occur in repeating the problem.

Therefore, it would be advantageous to have an improved computer implemented method, apparatus, and computer usable program code for identifying performance problems in applications.

SUMMARY OF THE INVENTION

The illustrative embodiments provide a computer implemented method, apparatus, and computer usable program code for profiling an application. Data is collected for analyzing performance of the application using a device driver for a profiler in an operating system kernel in response to the application executing in a virtual machine. Data is stored in a buffer. A report is generated containing the data from the buffer in response to an event in the virtual machine, wherein the application is profiled using the report. Collection of the data is halted in response to the application terminating execution in the virtual machine.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIG. 3 is a diagram illustrating components used for providing automatic profiling in accordance with an illustrative embodiment;

FIG. 4 is a diagram of components used to obtain trace and performance information in accordance with an illustrative embodiment;

FIG. 5 is a flowchart of a process for gathering trace data during execution of an application in accordance with an illustrative embodiment; and FIG. 6 is a flowchart of a process for installing a profiler in accordance with an illustrative embodiment.

DETAILED DESCRIPTION OF THE PREFERRED EMBODIMENT

Figure 1:
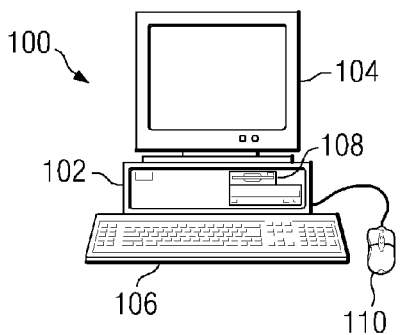
FIG. 1 is a pictorial representation of a data processing system in which illustrative embodiments may be implemented.

With reference now to the figures and in particular with reference to FIG. 1, a pictorial representation of a data processing system is shown in which illustrative embodiments may be implemented. Computer 100 includes system unit 102, video display terminal 104, keyboard 106, storage devices 108, which may include floppy drives and other types of permanent and removable storage media, and mouse 110. Additional input devices may be included with personal computer 100. Examples of additional input devices include a joystick, touchpad, touch screen, trackball, microphone, and the like.

Computer 100 may be any suitable computer, such as an IBM® eServer™ computer or IntelliStation® computer, which are products of International Business Machines Corporation, located in Armonk, N.Y. Although the depicted representation shows a personal computer, other embodiments may be implemented in other types of data processing systems. For example, other embodiments may be implemented in a network computer. Computer 100 also preferably includes a graphical user interface (GUI) that may be implemented by means of systems software residing in computer readable media in operation within computer 100.

Figure 2:
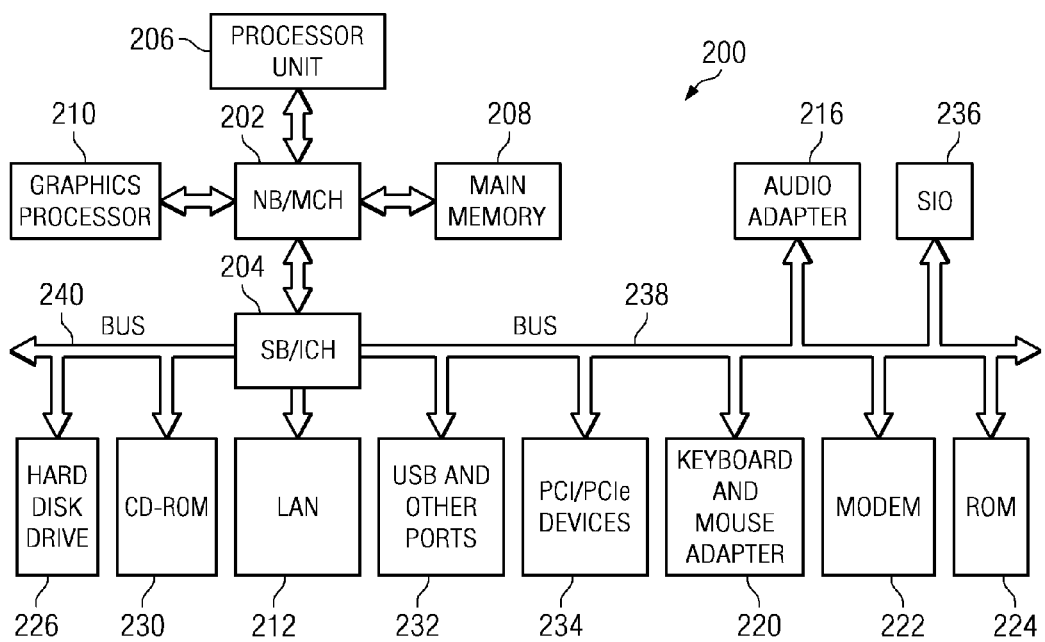
FIG. 2 depicts a block diagram of a data processing system in which illustrative embodiments may be implemented.

Next, FIG. 2 depicts a block diagram of a data processing system in which illustrative embodiments may be implemented. Data processing system 200 is an example of a computer, such as computer 100 in FIG. 1, in which code or instructions implementing the processes of the illustrative embodiments may be located.

In the depicted example, data processing system 200 employs a hub architecture including a north bridge and memory controller hub (MCH) 202 and a south bridge and input/output (I/O) controller hub (ICH) 204. Processing unit 206, main memory 208, and graphics processor 210 are coupled to north bridge and memory controller hub 202. Processing unit 206 may contain one or more processors and even may be implemented using one or more heterogeneous processor systems. Graphics processor 210 may be coupled to the MCH through an accelerated graphics port (AGP), for example.

In the depicted example, local area network (LAN) adapter 212 is coupled to south bridge and I/O controller hub 204, audio adapter 216, keyboard and mouse adapter 220, modem 222, read only memory (ROM) 224, universal serial bus (USB) ports, and other communications ports 232. PCI/PCIe devices 234 are coupled to south bridge and I/O controller hub 204 through bus 238. Hard disk drive (HDD) 226 and CD-ROM drive 230 are coupled to south bridge and I/O controller hub 204 through bus 240.

PCI/PCIe devices may include, for example, Ethernet adapters, add-in cards, and PC cards for notebook computers. PCI uses a card bus controller, while PCIe does not. ROM 224 may be, for example, a flash binary input/output system (BIOS). Hard disk drive 226 and CD-ROM drive 230 may use, for example, an integrated drive electronics (IDE) or serial advanced technology attachment (SATA) interface. A super I/O (SIO) device 236 may be coupled to south bridge and I/O controller hub 204.

An operating system runs on processing unit 206. This operating system coordinates and controls various components within data processing system 200 in FIG. 2. The operating system may be a commercially available operating system, such as Microsoft® Windows XP®. (Microsoft® and Windows XP® are trademarks of Microsoft Corporation in the United States, other countries, or both). An object oriented programming system, such as the Java™ programming system, may run in conjunction with the operating system and provides calls to the operating system from Java™ programs or applications executing on data processing system 200. Java™ and all Java-based trademarks are trademarks of Sun Microsystems, Inc. in the United States, other countries, or both.

Instructions for the operating system, the object-oriented programming system, and applications or programs are located on storage devices, such as hard disk drive 226. These instructions and may be loaded into main memory 208 for execution by processing unit 206. The processes of the illustrative embodiments may be performed by processing unit 206 using computer implemented instructions, which may be located in a memory. An example of a memory is main memory 208, read only memory 224, or in one or more peripheral devices.

The hardware shown in FIG. 1 and FIG. 2 may vary depending on the implementation of the illustrated embodiments. Other internal hardware or peripheral devices, such as flash memory, equivalent non-volatile memory, or optical disk drives and the like, may be used in addition to or in place of the hardware depicted in FIG. 1 and FIG. 2. Additionally, the processes of the illustrative embodiments may be applied to a multiprocessor data processing system.

The systems and components shown in FIG. 2 can be varied from the illustrative examples shown. In some illustrative examples, data processing system 200 may be a personal digital assistant (PDA). A personal digital assistant generally is configured with flash memory to provide a non-volatile memory for storing operating system files and/or user-generated data. Additionally, data processing system 200 can be a tablet computer, laptop computer, or telephone device.

Other components shown in FIG. 2 can be varied from the illustrative examples shown. For example, a bus system may be comprised of one or more buses, such as a system bus, an I/O bus, and a PCI bus. Of course the bus system may be implemented using any suitable type of communications fabric or architecture that provides for a transfer of data between different components or devices attached to the fabric or architecture. Additionally, a communications unit may include one or more devices used to transmit and receive data, such as a modem or a network adapter. Further, a memory may be, for example, main memory 208 or a cache such as found in north bridge and memory controller hub 202. Also, a processing unit may include one or more processors or CPUs.

The depicted examples in FIG. 1 and FIG. 2 are not meant to imply architectural limitations. In addition, the illustrative embodiments provide for a computer implemented method, apparatus, and computer usable program code for compiling source code and for executing code. The methods described with respect to the depicted embodiments may be performed in a data processing system, such as data processing system 100 shown in FIG. 1 or data processing system 200 shown in FIG. 2.

The illustrative embodiments provide a computer implemented method, apparatus, and computer usable program code for collecting performance data for use in analyzing performance problems in an application. In response to an application executing in a virtual machine, data for analyzing performance of the application is collected using a device driver or a profiler in an operating system kernel. This data is stored in a circular buffer in which portions of the data are overwritten when the circular buffer becomes full. In response to a selected event occurring in the virtual machine, a report is generated containing the data from the circular buffer in which the application is profiled using the report. The collection of data halts when the virtual machine execution terminates.

The event causing the generation of the report may be one requiring the data dump by the virtual machine. This event may be, for example, a signal to generate a dump or a termination of execution by the virtual machine. The data may be collected when, for example, a class library for the virtual machine is loaded for use. In these examples, the virtual machine is a Java™ virtual machine. However, the different embodiments may be implemented using other virtual machines.

In these illustrative examples, a performance tool, such as tprof, is delivered with an application, such as a Java™ virtual machine. The profiler may be installed during installation of the Java™ virtual machine. The profiler may be directed to gather data associated with the execution of a particular application or a set of applications, such as one or more class libraries. The gathering of data occurs whenever the application is executing. For example, when a specified class library is loaded, the profiler may be started. When the class library is unloaded, the profiler may then be halted. The application may be the Java™ virtual machine.

In these examples, the profiler is in a continuous tracing mode and keeps the most recent data while wiping out the oldest data while the application is running. Alternatively, the data may be written out before wiping out the oldest data. Although, in these examples, the application is a Java™ virtual machine, the different embodiments may be applied to other virtual machines and applications. When data is dumped by the Java™ virtual machine, the data collected by the profiler also is captured and placed into a data dump or report.

In this manner, the monitoring of an application and providing performance first failure data capture with the most recent data is accomplished. A customer may supply the data dump, which includes the performance data, for further analysis. The data gathered by the profiler may be appended to the data dump. Depending on customer experience or knowledge, the customer may be able to identify the problem without requiring further support.

Turning now to FIG. 3, a diagram illustrating components used for providing automatic profiling is depicted in accordance with an illustrative embodiment. In this example, profiler 300 is provided as a part of Java™ virtual machine 302 and may profile the execution of applications, such as application 304. This profiling may be for all applications or selected applications. Application 304 may be, for example, a specified class library. Profiler 300 includes a component in the form of device driver 306 that executes within kernel 308. When processor 310 generates an interrupt, such as interrupt 312, device driver 306 in kernel 308 generates records to form trace 314 within trace buffer 316.

In these examples, profiler 300 does not execute using application timers. Instead, device driver 306 in kernel 308 continuously obtains trace information and stores this trace information in trace 314. Profiler 300 initiates the collection of data by device driver 306 in response to execution of application 304. When execution terminates on application 304, profiler 300 causes device driver 306 to stop collecting data.

Trace buffer 316 is implemented as a circular buffer in which data may be overwritten after trace buffer 316 becomes full. The data collected in trace buffer 316 is data used to analyze the performance of application 304. This analysis is also referred to as profiling. The data gathered in trace buffer 316 may vary depending on the particular implementation. For example, the data may be event data, sample data, counter data, or some combination of these different types of data. The data may include, for example, a process identifier, a thread identifier, an instruction pointer, and a time stamp indicating when the sample was taken.

This information may be used to answer various questions regarding performance of application 304. The processes for collection of trace data are currently used. The different illustrative embodiments implement this type of data collection in a device driver in an operating system rather than on an application level. The different types of trace data collected may be implemented in device driver 306 using processes from tprof.

In these examples, trace information is only required for some period of time before some event, such as a failure or error occurs. Upon the occurrence of this type of error Java™ virtual machine 302 receives trace 314 and obtains other information to generate a dump of data. Java™ virtual machine 302 may initiate a data dump in response to an error, such as an out-of-memory condition, a detected slow down, such as, a garbage collection that exceeded a predetermined amount of time, or a termination of Java™ virtual machine 302.

Turning now to FIG. 4, a diagram of components used to obtain trace and performance information is depicted in accordance with an illustrative embodiment. Profiler 400 contains trace controller 402, interface 404, and device driver 406. Trace controller 402 and interface 404 are components found in profiler 300 in FIG. 3. Device driver 406 is an example of device driver 306 installed within kernel 308 in FIG. 3. Interface 404 provides an interface for trace controller 402 to communicate with device driver 406. Through interface 404, trace controller 402 may enable or disable the collection of trace data by device driver 406. In these examples, device driver 406 is enabled when the Java™ virtual machine begins execution.

Device driver 406 generates trace entries 408 within trace buffer 410. Each of these trace entries contains information, such as a process identifier, a thread identifier, and an instruction pointer. The particular type of trace information located in each entry may vary depending on the particular implementation. Device driver 406 gathers this information and generates an entry on a periodic basis based on an interrupt received from a processor. Device driver 406 programs this interrupt in the processor when device driver 406 is initialized.

When an event occurs that causes the Java™ virtual machine to initiate a data dump, device driver 406 returns trace entries 408 to trace controller 402 through interface 404 through a request from trace controller 402. Trace entries 408 are then sent to post processor 412 for inclusion within report 414 along with other data gathered by Java™ virtual machine.

Additionally, device driver 406 also gathers module, table, and entry (MTE) data 418 and returns this information to trace controller 402, which in turn, sends it to post processor 412.

Post processor 412 is part of the Java™ virtual machine in these examples. This component uses address name library 416 to convert addresses present in the Java™ virtual machine to items like a jitted method, a dynamic link library and executables in the Java™ virtual machine. The addresses may be correlated using a time stamp. With this system, trace entries 408 are not required to perform the address to name conversions. Post processor 412 may obtain symbols by using load maps present at the time the report is generated and using profiler 400 to obtain jitted and thread names. Trace entries 408 contain information needed with other data obtained by post processor 412 to obtain symbolic information. The symbolic information is used to translate addresses into symbolic names that have meaning to human users. Any symbolic resolution methodology may be used by the different embodiments.

Turning now to FIG. 5, a flowchart of a process for gathering trace data during execution of an application is depicted in accordance with an illustrative embodiment.

The process begins by detecting initiation of an application (step 500). The tracing process is started (step 502). Trace data is collected (step 504). Data is stored in a circular buffer (step 506). Next, the process determines if an event has occurred that requires the generation of a report (step 508). This event may be, for example an abnormal termination of the application or some other event of interest. If an event occurs that requires a report, the report is generated (step 510) with the process terminating thereafter. If the process determines that no report is required in step 508, the process returns to step 504 to continue to collect trace data.

In this example, the application is the virtual machine. Alternatively, the application may be a class library executed by the virtual machine. In that implementation, termination of the application may not generate a report. Instead, termination of the application results in halting the collection of trace data. In these examples, the initiation of application execution in step 500 may be detected using device driver for the profiler. For example, device driver 306 in FIG. 3 may detect initiation of Java™ virtual machine 302 in FIG. 3 as the application or another application, such as application 304 in Java™ virtual machine 302 in FIG. 3.

Turning now to FIG. 6, a flowchart of a process for installing a profiler is depicted in accordance with an illustrative embodiment. In this example, the process in FIG. 6 is one used to install components for a profiler, such as a device driver. The application in this example may be, for example, a class library installed for the Java™ virtual machine. Depending on the particular implementation, the application may be the Java™ virtual machine itself.

The process begins by beginning an application install (step 600). The user is prompted to install the device driver needed by the profiler (step 602). Next the process determines if the device driver is to be installed (step 604). If the device driver is to be installed, the device driver is included in the installation of the application (step 606). The installation of the application is completed (step 608) with the process terminating thereafter.

Turning back to the determination made at step 604, if the process determines the device driver is not to be installed, the application installation is completed as described in step 608.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any tangible apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable storage medium include a semiconductor or solid state memory, magnetic tape, a removable computer diskette, a random access memory (RAM), a read-only memory (ROM), a rigid magnetic disk and an optical disk. Current examples of optical disks include compact disk—read only memory (CD-ROM), compact disk—read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A computer implemented method for profiling an application, the computer implemented method comprising:
   responsive to the application executing in a virtual machine, continuously collecting data for analyzing performance of the application, until the application terminates execution, using a device driver for a profiler in an operating system kernel;
   storing the data in a buffer;
   responsive to an event in the virtual machine, generating a report containing the data from the buffer, wherein the application is profiled using the report; and
   responsive to the application terminating execution in the virtual machine, halting collection of the data.

2. The computer implemented method of claim 1 further comprising:
   installing the virtual machine; and
   installing the profiler including the device driver when installing the virtual machine.

3. The computer implemented method of claim 1, wherein the application is a class library for the virtual machine.

4. The computer implemented method of claim 1, wherein the generating step comprises:
   responsive to an event requiring a data dump by the virtual machine, collecting the data from the buffer; and
   placing the data in a file with the data dump.

5. The computer implemented method of claim 1, wherein the event is a termination of execution of the virtual machine.

6. The computer implemented method of claim 1, wherein the storing step comprises:
   storing the data in a circular buffer, wherein portions of the data are overwritten when the circular buffer becomes full.

7. A data processing system comprising: a processor;
   a virtual machine;
   installing means for installing a profiler to profile a selected application in the virtual machine, using a device driver for a profiler in an operating system kernel, wherein the device driver collects data associated with an execution of the selected application in buffer;
   starting means for starting the profiler when the selected application is loaded; and
   stopping means for stopping the profiler when the selected application is unloaded.

8. The data processing system of claim 7, further comprising a circular buffer for storing the data, wherein portions of the data are overwritten in the circular buffer when the circular buffer becomes full.

9. A computer program product comprising:
   a computer usable storage medium having computer usable program code stored thereon for profiling an application, the computer usable program code comprising:
   computer usable program code, responsive to the application executing in a virtual machine, for continuously collecting data for analyzing performance of the application, until the application terminates execution, using a device driver for a profiler in an operating system kernel;
   computer usable program code for storing the data in a buffer;
   computer usable program code, responsive to an event in the virtual machine, for generating a report containing the data from the buffer, wherein the application is profiled using the report; and
   computer usable program code, responsive to the application terminating execution in the virtual machine, for halting collection of the data.

10. The computer program product of claim 9 further comprising:
    computer usable program code for installing the virtual machine; and
    computer usable program code for installing the profiler including the device driver when installing the virtual machine.

11. The computer program product of claim 9, wherein the application is a class library for the virtual machine.

12. The computer program product of claim 9, wherein the computer usable program code, responsive to an event in the virtual machine, for generating a report containing the data from the buffer, wherein the application is profiled using the report comprises:
  computer usable program code, responsive to an event requiring a data dump by the virtual machine, for collecting the data from the buffer; and
  computer usable program code for placing the data in a file with the data dump.

13. The computer program product of claim 9, wherein the event is a termination of execution of the virtual machine.

14. The computer program product of claim 9, wherein the buffer is a circular buffer, wherein portions of the data are overwritten when the circular buffer becomes full.

* * * * *